(12) United States Patent
Schmidt et al.

(10) Patent No.: US 7,931,319 B2
(45) Date of Patent: Apr. 26, 2011

(54) BUMPER OF A MOTOR VEHICLE

(75) Inventors: Christoph Schmidt, Anzing (DE); Frank Seifert, Neuried (DE); Torsten Gröning, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/713,887

(22) Filed: Feb. 26, 2010

(65) Prior Publication Data

US 2010/0219649 A1    Sep. 2, 2010

(30) Foreign Application Priority Data

Feb. 27, 2009 (DE) .................. 10 2009 010 673

(51) Int. Cl.
*B60R 19/28* (2006.01)

(52) U.S. Cl. ..... 293/133; 293/135; 293/155; 296/187.04

(58) Field of Classification Search ............. 296/187.02, 296/187.04, 187.09; 293/131–137, 155; 188/371, 377

See application file for complete search history.

(56) References Cited

U.S. PATENT DOCUMENTS

| | | | | |
|---|---|---|---|---|
| 1,755,007 A | * | 4/1930 | Jackson | 293/131 |
| 3,853,344 A | * | 12/1974 | Shimoe | 293/131 |
| 4,109,899 A | * | 8/1978 | Takatsu | 267/140 |
| 4,542,925 A | | 9/1985 | Huber et al. | |
| 4,679,838 A | * | 7/1987 | Mikina | 293/137 |
| 6,050,624 A | * | 4/2000 | Kim | 293/132 |
| 6,174,008 B1 | | 1/2001 | Kramer et al. | |
| 7,029,044 B2 | * | 4/2006 | Browne et al. | 293/137 |
| 7,413,227 B2 | * | 8/2008 | Straughn | 293/135 |
| 7,607,720 B2 | * | 10/2009 | Noyori et al. | 296/187.04 |
| 7,823,959 B2 | * | 11/2010 | Wallman et al. | 296/187.04 |
| 2008/0228356 A1 | | 9/2008 | Nolze et al. | |

FOREIGN PATENT DOCUMENTS

| | | |
|---|---|---|
| DE | 32 32 940 C2 | 3/1984 |
| DE | 44 13 641 C1 | 6/1995 |
| DE | 198 06 541 A1 | 9/1998 |
| DE | 198 47 385 C1 | 4/2000 |
| DE | 103 26 783 A1 | 1/2005 |
| DE | 10 2006 048 333 | 4/2008 |
| DE | 10 2007 012 962 | 9/2008 |
| GB | 2 322 602 | 9/1998 |

\* cited by examiner

*Primary Examiner* — Glenn Dayoan
*Assistant Examiner* — Gregory Blankenship
(74) *Attorney, Agent, or Firm* — Henry M. Feiereisen; Ursula B. Day

(57) ABSTRACT

A bumper of a motor vehicle includes a cross member which is disposed transversely to a side rail of a motor vehicle frame and movable from a standby position in a direction of the motor vehicle. Placed between the cross member and the side rail is a crash box. A coupler maintains a distance between the cross member and the crash box, when the cross member assumes the standby position, and a strut extends at an inclination between the cross member and the crash box to connect the cross member to the crash box. The strut is supported upon the cross member by a linear guide and supported upon the crash box by a swivel joint.

8 Claims, 1 Drawing Sheet

BUMPER OF A MOTOR VEHICLE

CROSS-REFERENCES TO RELATED APPLICATIONS

This application claims the priority of German Patent Application, Serial No. 10 2009 010 673.1, filed Feb. 27, 2009, pursuant to 35 U.S.C. 119(a)-(d), the content of which is incorporated herein by reference in its entirety as if fully set forth herein.

BACKGROUND OF THE INVENTION

The present invention relates, in general, to a bumper of a motor vehicle.

The following discussion of related art is provided to assist the reader in understanding the advantages of the invention, and is not to be construed as an admission that this related art is prior art to this invention.

Bumpers are typically arranged across the front and rear of a motor vehicle between the plastic shell of the vehicle body and the frame of the motor vehicle. To prevent damage to the vehicle body structure in the event of a crash or impact at low speed, crash boxes are integrated to absorb energy caused by the impact and to convert the energy in deformation work. Also, pedestrians are protected by bumpers in the event of an impact by a motor vehicle.

Bumpers typically include a rigid cross member arranged in the horizontal plane in perpendicular relationship to the travel direction and attached to the right and left side rails via crash boxes, respectively. The crash boxes absorb the impact energy by undergoing a plastic deformation in the event of a frontal crash at low speed, typically in a rear-end collision on urban streets. Official regulations as well as voluntary intents by the automobile industry to protect passengers led to the construction of bumpers to also minimize stress to a pedestrian's lower extremities in the event of a collision between the pedestrian and the vehicle front. For that purpose, impact tests have been established using a leg impactor to ensure compliance with several limit values.

Oftentimes, to provide adequate protection of pedestrians, bumpers are provided with energy absorbers attached directly to the front side of the cross member. An example is disclosed in German Pat. No. DE 44 13 641 C1, in which the use of shock absorbers are described which are made of plastic foam or a plastic honeycomb structure. Other examples involve the use of an undulating leaf spring as energy absorbing element (U.S. Pat. No. 4,542,925), or energy absorbers in the form of thin sheet metal strips which are attached as open profile onto the cross member.

An alternative to the afore-described passive systems involves the construction of bumpers with actively controllable elements to react to an impact. An example is disclosed in U.S. Pat. No. 6,174,008 and involves a bumper which is mounted in such a way that it can be moved between a rest position and an operating position. The movement is hereby realized by a shape-memory spring which acts on the bumper and is prestressed in the rest position.

It would be desirable and advantageous to provide an improved bumper to obviate prior art shortcomings and to exhibit superior impact absorption characteristics while still being simple in structure so as to, i.a. reduce a vehicle overhang.

SUMMARY OF THE INVENTION

According to one aspect of the present invention, a bumper of a motor vehicle includes a cross member disposed transversely to a side rail of a motor vehicle frame and movable from a standby position in a direction of the motor vehicle, a crash box placed between the cross member and the side rail, a coupler maintaining a distance between the cross member and the crash box, when the cross member assumes the standby position, a strut extending at an inclination between the cross member and the crash box to connect the cross member to the crash box, a linear guide for support of the strut upon the cross member, and a swivel joint for support of the strut upon the crash box.

According to another advantageous feature of the present invention, the strut may have a U-shaped configuration.

The coupler, for example a rod or bar, can extend rectilinear in length direction of the motor vehicle between the cross member and the crash box and can be held with its crash-box-proximal end in a guide.

According to another advantageous feature of the present invention, at least one locking element can be provided for locking the cross member in the standby position. The locking element may be releasable by a sensor mechanism. Advantageously, the locking element is constructed for interaction with the coupler. The sensor mechanism may hereby be constructed to recognize an unavoidable collision with a pedestrian and as a result to release the locking element. This may be implemented in a pyrotechnic manner for example. The system is thus unlocked. The cross member is now able to move in a direction of the crash box in the event of a force impact. The translation of the cross member is linear or rectilinear and maintains a movement along a straight path without tilting or material peeling.

The application of a pre-crash sensor mechanism may, of course, also be conceivable, e.g. a sensor mechanism including a 2D camera or a laser scanner or also radar sensors. Such sensors monitor constantly the region immediately in front of the vehicle and activate the system before an impact takes place. Also possible is the use of a contact sensor mechanism which may include for example force sensors or optical waveguides.

As the cross member is able to yield in the event of a collision with a pedestrian, the risk of injury can be reduced, in particular to the lower extremities of a pedestrian.

According to another advantageous feature of the present invention, a damping unit may be placed between the cross member and the crash box. Suitably, the damping unit includes a spring element interacting with the strut.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
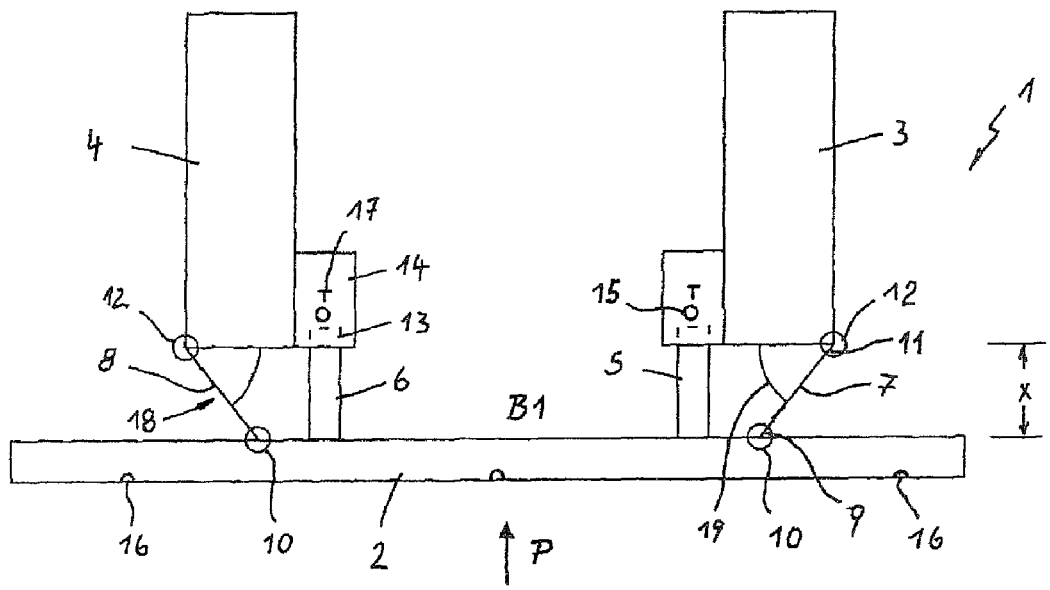
FIG. 1 is a simplified schematic illustration of a bumper according to the present invention in standby position.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
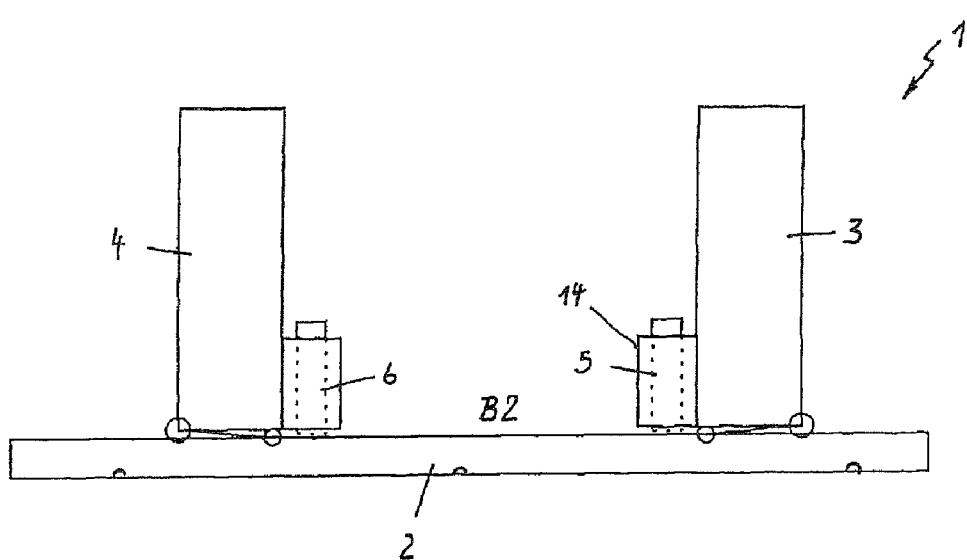
FIG. 2 is a simplified schematic illustration of the bumper of FIG. 1 after impact.

Turning now to the drawing, and in particular to FIG. 1, there is shown a simplified schematic illustration of a bumper according to the present invention, generally designated by reference numeral 1. FIG. 2 shows the bumper 1 after being subjected to an impact. The bumper 1 is intended for installation across the front and rear of a motor vehicle between a shell of the vehicle body and the frame of the motor vehicle, in particular for the front region. The bumper 1 includes a cross member 2 arranged transversely to unillustrated side rails of the motor vehicle, and crash boxes 3, 4 which are placed between the cross member 2 and the side rails. In addition to the cross member 2, the crash boxes 3, 4 are intended to absorb energy caused by an impact and to convert it into deformation work. The bumper 1 should further contribute to the protection of pedestrians and in particular to reduce the risk of injury in a collision with a motor vehicle.

The cross member 2 is preferably made of a sheet metal, e.g. a hot formed steel sheet. FIG. 1 shows the cross member 2 in standby position B1 in which the cross member 2 is arranged in length direction of the motor vehicle at a distance x to the crash boxes 3, 4 and maintained at the distance x by couplers 5, 6, respectively. Further placed between the cross member 2 and the crash boxes 3, 4 are slanted struts 7, 8, respectively. The struts 7, 8 are supported with their cross-member-proximal end 9 upon the cross member 2 via a linear guide 10, and with their crash-box-proximal end 11 upon the crash boxes 3, 4, respectively, via a swivel joint 12.

The couplers 5, 6 are held with their crash-box-proximal ends 13 in guides 14, respectively. The cross member 2 is locked in the standby position B1 by locking elements 15 which are operatively connected within the guides 14 to the couplers 5, 6 and maintain the cross member 2 in the standby position B1.

Further provided is a sensor mechanism, e.g. a pre-crash sensor mechanism, with pertaining automatic control unit, including sensors 16, depicted only schematically, for recognizing an unavoidable collision with a pedestrian, actuators 17 for releasing the locking elements 15. Of course, the use of a contact sensor mechanism is conceivable as well.

The sensors 16 and the actuators 17 are operatively connected to one another via an arithmetic and control unit so that all operations can be executed in chronological and logical sequence. Detection of an unavoidable collision with a pedestrian by the sensors 16 triggers operation of the actuators 17, e.g. pyrotechnically, to release the locking elements 15 so that the couplers 5, 6 are liberated, allowing the cross member 2 to move under the action of the force in a direction of arrow P towards the crash boxes 3, 4. As a result of the yielding motion, the impact on a pedestrian can be alleviated and the risk of injury, in particular to the lower extremities, can be reduced.

The yielding capability of the bumper 1 can further be improved through integration of a damping unit 18 which advantageously is placed between the cross member 2 and the crash boxes 3, 4. The damping unit 18 includes spring elements 19 which interact with the slanted struts 7, 8 to support them when exposed to a force caused by an impact and to realize a yielding behavior of the struts 7, 8 in a defined manner.

After release, the cross member 2 is able to move translatorily in a direction of the crash boxes 3, 4, without encountering tilting or material deformation. As the cross member 2 shifts, the struts 7, 8 pivot about the swivel joint 12, with the cross-member-proximal ends 9 of the struts 7, 8 moving in the guides 10. FIG. 2 shows the blocked position B2 in which the cross member 2 is supported directly by the front end of the crash boxes 3, 4. In the blocked position B2, the bumper 1 assumes its typical function, causing a deformation of the crash boxes 3, 4, when a particular force level has been exceeded.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper of a motor vehicle, comprising:
   a cross member disposed transversely to a side rail of a motor vehicle frame and movable from a standby position in a direction of the motor vehicle;
   a crash box placed between the cross member and the side rail;
   a coupler maintaining a distance between the cross member and the crash box, when the cross member assumes the standby position;
   a strut extending at an inclination between the cross member and the crash box to connect the cross member to the crash box;
   a linear guide for support of the strut upon the cross member; and
   a swivel joint for support of the strut upon the crash box.

2. The bumper of claim 1, wherein the strut has a U-shaped configuration.

3. The bumper of claim 1, further comprising a guide for retaining a crash-box-proximal end of the coupler.

4. The bumper of claim 1, further comprising at least one locking element for locking the cross member in the standby position.

5. The bumper of claim 4, further comprising a sensor mechanism to release the locking element.

6. The bumper of claim 4, wherein the locking element is constructed for interaction with the coupler.

7. The bumper of claim 1, further comprising a damping unit placed between the cross member and the crash box.

8. The bumper of claim 7, wherein the damping unit includes a spring element interacting with the strut.

* * * * *